Patented Mar. 1, 1938

2,109,844

UNITED STATES PATENT OFFICE 2,109,844

CATALYTIC HYDROGENATION OF GLYCERIDES OF ALIPHATIC CARBOXYLIC ACIDS

Wilbur A. Lazier, Marshallton, Del., assignor to E. I. du Pont de Nemours & Company, Wilmington, Del., a corporation of Delaware No Drawing. Application August 11, 1934, Serial No. 739,417. In Canada February 27, 1932

6 Claims. (Cl. 260—156)

This invention relates to catalytic processes for the hydrogenation of the class of esters known as fats and fatty oils whereby the combined fatty acids in said esters are converted into the corresponding long chain alcohols and into waxy esters of the long-chain alcohols.

This application is a continuation in part of my copending application Ser. No. 520,473, filed March 5, 1931.

Higher alcohols are compounds of considerable technical importance, but owing to the difficulties heretofore involved in their preparation on a large scale, they have, with few exceptions, never become articles of commerce. Certain long-chain higher alcohols such as cetyl alcohol, however, have been prepared through the saponification of naturally occurring waxes such as spermaceti, but in general the higher alcohols containing from six to eighteen carbon atoms have been obtainable only through the reduction of esters of the corresponding fatty acids with an excess of metallic sodium in anhydrous alcohol according to the method of Bouveault and Blanc (Chemische Centralblatt 1904, II, 184; 1905, II, 1700).

On the other hand, the hardening of fats and oils by hydrogenation has been practiced on an industrial scale for many years under conditions of temperature and pressure that are to be sharply distinguished from the processes of the present invention.

In the older hydrogenation processes a glyceride of an unsaturated fatty acid containing a suspended nickel catalyst is agitated with hydrogen under a pressure slightly in excess of atmospheric pressure. The temperatures employed are usually 50° to 150° C. and never greater than 200° C. while the pressures customarily used are less than 10 atmospheres. According to some modifications of the hydrogenation processes of the prior art, the nickel catalyst is held stationary in a granular form while the warm oil is pumped over it in a hydrogen atmosphere. In still another modification of the same process, a mixture of oil and suspended catalyst is atomized into a chamber containing gaseous hydrogen. It is the purpose of these hydrogenation processes, as previously practiced, to obtain partial or complete saturation of the unsaturated bonds existing between certain adjacent carbon atoms in the unsaturated fatty acids constituting the glycerides undergoing hydrogenation. By this process the melting point of the fat is progressively raised as the saturation becomes more complete. The process as ordinarily carried out has no other chemical action on the fat molecule, absorption of hydrogen stopping when the unsaturated carbon linkages are fully satisfied. There is no rupture of the ester linkage holding the glyceride molecule together except for the formation of a very small amount of nickel soap resulting from reaction of the catalyst with the fatty acids. The characteristic odor of hydrogenated fats has recently been attributed to products resulting from the decomposition of the glycerol set free in this hydrolytic reaction, but the formation of long-chain higher alcohols from fatty glycerides had not been reported prior to my discovery of special conditions for accomplishing a new type of hydrogenation.

It should be mentioned in passing, that various attempts have also been made to effect the pyrolytic decomposition of fats to liquid hydrocarbons, for example, by heating a fat in contact with an iron oxide-thoria dehydrating catalyst in a reducing atmosphere, but obviously these processes bear no direct relation to the processes of the present invention whereby long-chain alcohols substantially free from hydrocarbons are obtained.

This invention has as an object a new process for the hydrogenation of fatty glycerides. A further object resides in novel methods for carrying out the hydrogenation of fats and fatty oils whereby long-chain higher alcohols and their esters are formed to the substantial exclusion of hydrocarbons. A still further object is the production of new compositions of matter comprising the aforementioned alcohols and other hydrogenation products.

The present invention describes an entirely new type of hydrogenation of fatty glycerides. According to the present invention it is the ester groups in the glycerides which are receptive to hydrogen absorption, with the resulting formation of higher alcohols corresponding in number of carbon atoms to the combined fatty acids of the glycerides, and glycerol or its decomposition products. The crude hydrogenation products thus obtained consist of a mixture of higher alcohols and other products, and this mixture in itself constitutes a new composition of matter, which in some instances finds use in the arts without any separation into its components. The pure alcohols, however, may be isolated by extraction, crystallization, or vacuum distillation of the crude hydrogenation products. Even in the absence of such a separation the presence of the alcohols and the amount thereof formed may be demonstrated conclusively by a determination of the decrease in the saponification value and the corresponding increase in the acetyl or hydroxyl value.

The processes of my invention are characterized by the use of an excess of hydrogen and temperatures and pressures much in excess of those ordinarily employed. In general the invention is carried out by bringing the oil and hydrogen into intimate contact with a suitable alcohol-forming catalyst at relatively high temperatures and pressures. There are, however, several modifications of the general process. For example, a mixture of the liquid fat, solid catalyst, and gaseous hydrogen may be brought together at high temperatures and pressures with suitable agitation in a closed autoclave capable of withstanding the necessary pressure. In this case the catalyst is preferably a composition containing copper either in the elementary form or combined with oxygen as a lower oxide. Other hydrogenating metal oxides may be employed in conjunction with copper, or suitable catalyst supports such as kieselguhr, silica gel, and activated carbon may be used. In another modification of the process the fatty oils and hydrogen are passed under high pressures and elevated temperatures over mixed hydrogenation catalysts containing substantial quantities of difficultly reducible oxides of hydrogenating metals prepared in a suitable granular form and held in place in a pressure-resisting tube. Contrary to expectation, it has been found that under high hydrogen pressures fats and fatty oils are much less susceptible to decomposition by heat than would be supposed from their behavior when heated in air. Under reducing conditions and in the presence of a suitable catalyst the decomposition, if such it may be termed, takes place in a controlled manner and with the absorption of hydrogen and the production of long-chain higher alcohols.

The following examples are illustrative of some of the methods that may be employed in practicing the invention:

*Example I*

An effective catalyst comprising a mixture of the chromates and chromites of different hydrogenating metals and containing also some of the oxides of these metals is prepared in the following manner:

A solution of a mixture of salts of hydrogenating metals is prepared by dissolving 245 parts of crystallized zinc nitrate, 23 parts of hydrated cadmium nitrate and 24 parts of copper nitrate (trihydrate) in 750 parts of water. To this solution there is added at ordinary temperature with stirring an equal volume of water containing 126 parts of ammonium bichromate and 75 parts of 28% ammonium hydroxide. The mixture is exactly neutralized with additional ammonium hydroxide and allowed to settle. After several washings by decantation, the precipitate is filtered, dried, and ignited at 400° C. The ignition causes an exothermic decomposition producing a black, pulverulent residue that may be granulated by mixing with water, drying, and compressing into tablets or grains suitable for use in catalytic gas apparatus. The catalyst may be prereduced with hydrogen before loading into the converter or may be reduced in place by heating up slowly in a low flow of the gas, prior to the hydrogenation.

One hundred cubic centimeters of the hydrogenation catalyst prepared as described above was placed in a steel reaction vessel capable of withstanding high pressures and was slowly heated to 380° C. in a stream of hydrogen. The exit valve was then closed and the hydrogen pressure allowed to build up to 2700 pounds per square inch. At this temperature and pressure, refined cottonseed oil was pumped over the catalyst at the rate of about 400 cubic centimeters per hour, while hydrogen was drawn through the system at the rate of about 15 cubic feet per hour, as measured under ordinary conditions of temperature and pressure at the exit of the reaction system. The treated oil was separated from the excess gas under pressure by passage through a trap before expanding to atmospheric pressure. The untreated oil had a saponification value of 195 and an iodine value of 115. After the hydrogenation treatment the saponification value of the product was 49 and the iodine number 89, indicating a 75% hydrogenation of the carboxyl groups of the fatty acids of the glycerides with only a 20% reduction in the olefinic unsaturation. Practically no free acid was formed, and the product was relatively free from hydrocarbons. The activity of the catalyst was undiminished after 67 hours of continuous operation, and upon opening the tube there was no evidence of deterioration due to the deposition of carbon or resinous organic matter. That the reduction in saponification value of the glycerides had taken place through the medium of hydrogenation of the carboxyl groups to primary alcohols, rather than to hydrocarbons, was demonstrated by a rise in the acetyl value of the oil corresponding closely to the observed decrease in the saponification value. The product was a semi-solid mass having a pleasant odor reminiscent of some of the simpler normal higher alcohols.

A sample of the crude cottonseed oil alcohols was hydrogenated further by means of a nickel catalyst in the liquid phase. By this treatment the iodine number was reduced to about 15 and the material hardened at room temperature to a firm white solid.

*Example II*

Under conditions similar to those described for the hydrogenation of cottonseed oil, a quantity of palm oil was hydrogenated with yields based on the decrease in saponification value averaging 66%. Cetyl alcohol was isolated from the crude hydrogenation product by extraction with suitable solvents.

*Example III*

Commercial coconut oil was also successfully hydrogenated at a temperature of 380° C. and a total pressure of about 2700 pounds per square inch. A mixed hydrogenation catalyst, prepared as described in Example I was slightly reduced in hydrogen preliminary to the introduction of the fat. The oil was passed over the catalyst at the rate of 400 cubic centimeters of liquid per 100 cubic centimeters of catalyst per hour, while hydrogen was put through at the rate of 12.5 cubic feet per hour. Assuming a mean molecular weight of about 600 for the glycerides, this amount of hydrogen was roughly equivalent to eight moles per mole of esterified fatty acid. The treated oil was separated from the excess hydrogen without difficulty and was recovered almost quantitatively. The conversion of esters to alcohols as measured by the decrease in the saponification value amounted to about 70% and there was no evidence of catalyst deterioration after 42 hours of continuous operation. The condensate contained about 30 cubic centimeters of water per liter, which was probably formed by dehydration of a part of the glycerol liberated by hydrogenation of the mixed glycerides. The hydrocarbon content of the crude coconut oil alcohols was less than 5%.

Three liters of the crude condensate was distilled through an efficient fractionating column at ten millimeters pressure. After the removal of a little water and glycerol, there was obtained 125 cubic centimeters of normal octanol, 350 cubic centimeters of decanol, 1230 cubic centimeters of lauryl alcohol, and 540 cubic centimeters of myristyl alcohol. These products were practically free from acids and esters. The still residue was waxy in character, contained no free acid, and had a saponification value of 70.

*Example IV*

With the same catalyst already described castor oil proved to be somewhat more resistant to reduction than some of the other oils. At 390° C., 2700 pounds per square inch hydrogen pressure, a space velocity of four volumes of oil per volume of catalyst per hour and a hydrogen-oil molecular ratio of 12 moles of hydrogen per mole of combined ricinoleic acid, the decrease in saponification value was about 60%, while the iodine number was lowered from 85 to 53. The product was quite fluid and possessed a pleasant alcoholic odor. By further hydrogenation with nickel in the liquid phase by the prior art method, it was readily converted to a white solid material, presumably containing a large proportion of a dihydric alcohol, and having an iodine number of about 8.

*Example V*

Partial reduction of linseed oil was effected by hydrogenating in the presence of a zinc chromite catalyst. This catalyst was prepared by the general method already described but contained no copper or cadmium as promoters. The temperature used was 365° C. and the pressure 2700 pounds per square inch. The oil was pumped over the catalyst at the rate of four catalyst volumes per hour while the hydrogen supply was maintained at the rate of ten moles per mole of combined fatty acids per hour.

The following tabulation indicates the nature of the chemical changes in the composition of the oil brought about by the hydrogenation process:

|  | Before treating | After treating |
|---|---|---|
| Acid number | 1 | 5 |
| Saponification number | 169 | 99 |
| Iodine number | 180 | 143 |

*Example VI*

China-wood oil when hydrogenated in accordance with the method set forth in Example V yielded substantially the same results obtained for linseed oil.

*Example VII*

By way of testing my new process on a pure glyceride, tributyrin was successfully hydrogenated to give normal butyl alcohol. Employing the preferred catalyst above described at a temperature of 367° C. and a pressure of 2800 pounds per square inch, the tributyrin was passed over the catalyst at a liquid space velocity of nine catalyst volumes per hour with a hydrogen-butyric acid molecular ratio of 16. Upon adding water to the crude product and distilling, there was obtained a fraction of n-butanol-water binary mixture corresponding in amount to a 53% conversion of the glyceride to the corresponding alcohol.

*Example VIII*

Under conditions similar to those given in Example VII, a sample of chemically pure triacetin yielded by the same treatment ethyl alcohol corresponding to a 31% conversion of the glyceride.

A similar series of long-chain alcohols of high molecular weight were obtained by hydrogenating palm kernel oil under the conditions described in the preceding examples for the treatment of coconut oil.

In the foregoing examples I have disclosed in detail the methods used and results obtained when conducting the hydrogenation of glycerides to alcohols according to the continuous flow process wherein a stationary bed of granular catalyst is employed. As already indicated, an alternative procedure may be employed which involves the treatment of the fat in a liquid pool with hydrogen in the presence of a finely divided suspended catalyst as outlined in the following examples:

*Example IX*

A copper chromite catalyst was prepared as follows: 1500 grams of copper nitrate dissolved in 4 liters of water was mixed with a solution containing 1000 grams of ammonium chromate in an equal volume of water. Ammonium hydroxide was added to neutralize the acidity developed during precipitation of the copper ammonium chromate. The precipitate was washed by decantation, filtered, and dried, after which it was ignited at a temperature of 400° C. The resulting copper chromite powder was extracted twice by stirring it for 15 minutes each time with a solution of 800 grams of glacial acetic acid in 6 liters of water. After extraction, the copper chromite was washed free from acid, filtered, dried, and screened 20 mesh. 200 grams of refined cottonseed oil and 10 grams of the copper chromite catalyst prepared as described above were placed in a shaking autoclave. Hydrogen was introduced until the pressure reached 3000 lbs. per square inch. The mixture was then heated to 290° C. and agitated for 3 hours, meanwhile maintaining the hydrogen pressure near the initial value. The resulting crude cottonseed oil alcohols were removed from the autoclave and filtered to remove the catalyst. The filtered product was a white solid having a saponification number of 43, representing a conversion of the fat to the corresponding fatty alcohols of about 75%, and an iodine number of 1.4 representing substantially complete saturation of the olefine double bond. The product was singularly free from hydrocarbons.

*Example X*

A copper-barium-chromite catalyst was prepared as follows: 260 grams of barium nitrate and 2180 grams of cupric nitrate were dissolved in 8 liters of water by heating to 70° C. A solution of 1260 grams of ammonium bichromate and 1.5 liters of 28% ammonium hydroxide in 6 liters of water were added with stirring. The precipitate was filtered, dried, and ignited at 400° C. The ignition residue was then extracted twice with 10% acetic acid, washed, and dried as described in Example I. 320 grams of this catalyst and 4000 grams of 12-hydroxy stearin (hardened castor oil) were placed in a stirring autoclave and hydrogen was introduced to a pressure of 3000 lbs. per square inch which was maintained throughout the run. The mixture was then heated to 260° C. and agitated for seven hours, after which hydrogen adsorption had ceased. After removal of the products from the autoclave and filtering, the alcohols thus obtained solidified to a hard solid having a melting point of about 65° C. The decrease in saponification number of the oil during hydrogenation corresponded to a 92% conversion of the carboxyl group, while the hydroxyl value of 347 obtained by analysis of the product indicated a substantially complete conversion of the hydroxy stearin to the corresponding octadecanediol-1,12.

*Example XI*

Four hundred and twenty pounds of copper nitrate and 176 pounds of chromic acid were dissolved in 350 gallons of water. 205 pounds of kieselguhr was then added to the solution followed by 88 pounds of anhydrous ammonia which was added with agitation during a period of 15 to 30 minutes. The precipitate was filtered, washed once on the filter and dried, after which it was ignited at 500° C. The resulting copper chromite-kieselguhr catalyst was extracted twice by stirring it for fifteen minutes each time with a solution of 200 pounds of glacial acetic acid in 225 gallons of water. After extraction, the catalyst was washed free from acid, filtered, dried, and screened twenty mesh. 200 pounds of coconut oil having a saponification number of 260 and 10 pounds of copper chromite-kieselguhr catalyst prepared as described above were charged into a high pressure autoclave and a gaseous mixture consisting of 70% hydrogen and 30% nitrogen was admitted to a pressure of 4500 pounds per square inch. The charge was then heated to 250 to 270° C. and agitated for five hours while the temperature was gradually increased to 315° C. At this point the temperature was held constant while additional hydrogen was blown through the charge, thus having the effect of agitating the catalyst and oil and supplying fresh hydrogen for the reaction. The rate of flow of hydrogen during the process was about 250 cu. ft. per minute. The pressure was maintained constant by drawing off in a continuous manner the more dilute hydrogen which emerged from the top of the autoclave. After one hour at 315° C. the saponification number of the oil had been reduced to less than 5, which is equivalent to about a 98% hydrogenation of the carboxyl groups. A yield of 88% of crude coconut oil alcohols was obtained having an acetyl number of 306 and comprising a mixture of alcohols containing from six to eighteen carbon atoms, but chiefly lauryl alcohol. The hydrocarbon content of the long-chain alcohol product was less than 0.5%.

Instead of the copper chromite-kieselguhr catalyst described in this example, a copper-kieselguhr catalyst prepared by depositing copper carbonate on kieselguhr and reducing in situ in the oil may be used with similar results.

In the ordinary hydrogenation process of the prior art there is no change in the saponification value of the fat, whereas according to the present process there is a marked lowering of the saponification value corresponding to a high yield of alcohols. The hydroxyl values of the products of the present invention rise from zero to values quite near the original saponification values, and corresponding with the lowering of the same. The nature of the reaction may be illustrated by the following equation in which R represents a saturated or unsaturated alkyl residue:

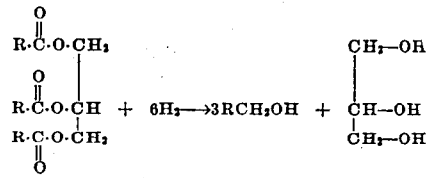

The long-chain higher alcohols represented by $RCH_2OH$ may be isolated in good yields but in most instances the amount of free glycerol formed is negligible. In distilling the product resulting from the hydrogenation of coconut oil a small amount of glycerol was separated as an oily layer from the fraction containing octyl and decyl alcohols. n-Propanol and 1,2-propylene glycol were present in larger quantities, indicating that glycerol is degraded in the hydrogenation process.

There appear to be several other side reactions of lesser importance. It is likely that during the hydrogenation process mono- and di-glycerides are formed by partial hydrogenation of the tri-glyceride molecule. Another possibility is the formation of glyceryl ethers with a portion of the alcohols formed by the reaction. Still another possible side reaction is the dehydration of a portion of the higher alcohols to give hydrocarbons from which the alcohols are difficult to separate, but under proper conditions of operation this reaction may be reduced to an item of negligible importance as already indicated in the examples.

If R in the formula above is an unsaturated radical, reduction or partial reduction of the carbon-carbon unsaturation may occur as in the usual hydrogenation process, but in the present process this is only incidental to the more important reaction of hydrogenation of the ester groups which results in the formation of alcohols. As an added step in my process, I sometimes prefer, after conducting the reaction as indicated above to favor alcohol formation, to hydrogenate the reaction products at low pressure and temperature with a nickel catalyst in the usual manner. This second hydrogenation step results in the saturation of any unsaturated alcohols that may be present as a result of using oils containing unsaturated acid radicals in the glyceride. It is to be noted that in my new process the hydrogenation is selective and favors the reduction of the ester groups to alcohols more than the saturation of the unsaturated carbon atoms in the acid radical of the glycerides.

Some wax-like materials are formed by my new process in addition to the alcohols. The amount of wax-like materials may be increased if desired by incompletely or partially hydrogenating the oils and then heating above 200° C. The partial hydrogenation may be effected by using the lower operative temperatures and either increasing the rate of flow of the oil or hydrogen as the case may be, or decreasing the rate of agitation. A still further yield of the wax-like products may be obtained by heating the partially hydrogenated oil with more oil or fat or free fatty acids or acid anhydrides.

While I do not desire to limit my invention by any theory which may be advanced to explain the facts herein disclosed, there is some evidence that during the distillation of the crude condensate, ester interchange takes place between the alcohols formed and the remaining unhydrogenated fat to produce waxy esters containing both higher alcohols and fatty acids.

Temperatures as low as 200° C. may be used in conducting the hydrogenation of fats and fatty oils to the corresponding alcohols, but the most satisfactory results are obtained between 250° and 400° C., depending somewhat on the catalyst composition selected and the chemical nature of the glyceride to be reduced.

The minimum pressure at which it is desirable to operate is about 13.5 atmospheres, the best results being obtained at higher pressures, usually between 75 and 400 atmospheres. Elevated temperatures and pressures are both essential to the success of the process but within the operative limits of temperature and pressure, the temperature is the most important factor in determining the yield of hydrogenation products. Thus, when the reaction is conducted at the higher temperatures with the lower operative pressures the yield is much greater than is obtained when the lower temperatures are used with the higher pressures. The higher temperature limit is determined by the temperature at which undesirable decomposition reactions take place, and insofar as I am aware the higher operative pressures are limited only by practical considerations for obtaining and retaining exceptionally high pressures. The optimum conditions will vary somewhat depending upon the fat treated, the degree of hydrogenation required and the freedom of the finished product from side products desired.

Whereas the critical factors and inventive steps in the hydrogenation of fatty glycerides to long-chain alcohols and waxes are the use of high temperatures and pressures, it necessarily follows that suitable catalysts may be selected from among a number of different hydrogenating metals and oxides. Mild hydrogenating catalysts such as metallic copper and zinc oxide which are well known to be suitable for the synthesis of methanol from carbon monoxide and hydrogen are in general also suitable catalysts for the production of alcohols from fats. On the other hand, there are certain very energetic catalysts such as metallic nickel and iron which are known to catalyze the formation of hydrocarbons from oxides of carbon and hydrogen. These ferrous metal catalysts, when employed in the hydrogenation of fats to long-chain alcohols and long-chain alcohol esters tend to carry the reaction too far with the formation of hydrocarbons. Therefore if the hydrogenation of a fatty glyceride is to be operated for the production of alcohols and esters to the substantial exclusion of hydrocarbons it is preferable to select as the catalyst a composition comprising a member of the group of non-ferrous hydrogenating metals such as copper, tin, silver, cadmium, zinc, lead, their oxides and chromites, and oxides of manganese and magnesium. Especially good results are obtained with finely divided copper oxide, either wholly or partially reduced and preferably supported upon an inert surface-extending material such as kieselguhr, or promoted by such oxide promoters as manganese oxide, zinc oxide, magnesium oxide, or chromium oxide. The above mentioned mild-acting catalysts may be termed the alcohol-forming catalysts to distinguish them from the more energetic hydrocarbon-forming elements of the platinum and ferrous metal groups. Elementary nickel, cobalt, and iron when suitably supported on kieselguhr may be used to effect the reduction of fatty glycerides with hydrogen, but in these cases the product contains besides alcohols and waxes a preponderance of hydrocarbons, and this disadvantage in most cases will prove so serious as to preclude the use of these catalysts unless the hydrocarbons themselves are the desired end products.

Catalysts suitable for use in the liquid phase batch method of hydrogenation are preferably prepared in a powder form. The preferred catalyst for this purpose is usually a copper chromite prepared by igniting a double copper ammonium chromate to its spontaneous decomposition temperature as described in U. S. Patent 1,746,783. Many modifications of this procedure have been practiced involving the use of acid extraction, hydrogen reduction, and the use of a supplementary support such as kieselguhr, but these are modifications in degree only. The essential feature is the use of copper oxide intimately associated or combined with chromium sesquioxide and the chromite method of preparation is a convenient method for effecting the desired association. The method, however, is not limited to copper, but may be practiced in the preparation also of zinc chromite, silver chromite, manganese chromite, etc.

For use in the continuous flow method of hydrogenating fats and fatty oils certain metal oxides belonging to the class of difficultly reducible hydrogenating oxides may be conveniently employed on account of their rugged character and the ease with which they may be shaped into hard granules for loading into stationary apparatus. By the term "difficultly reducible" is meant that the oxides are not substantially reduced to metal by prolonged exposure in a state of purity to the action of hydrogen at atmospheric pressure and at a temperature of 400° to 450° C. Such oxides suitable for use as catalysts in the hydrogenation of fats are zinc oxide, manganese oxide, and magnesium oxide. These oxides may be employed either alone or in combination with each other or with other metals or oxides which have a promoting action. Preferably the difficultly reducible hydrogenating oxides also are prepared in the form of chromites as already indicated in the examples.

With respect to the ratio of hydrogen to glyceride I prefer to use an excess of hydrogen. In the case of hydrogenation in a closed autoclave, the hydrogen excess is of course very large. When operating the continuous flow process, I prefer to use from two to ten moles of hydrogen per mole of combined fatty acid.

Again referring to the flow method, the rate at which the fats may be passed over the catalyst is a function of the molecular weight of the fat and the catalytic activity of the contact mass. For the ordinary fats and fatty oils from two to eight volumes are ordinarily passed per hour per unit volume of catalyst, but higher rates may be used at the expense of slightly lower conversions.

From the foregoing it will be apparent that I have developed a process for producing higher alcohols cheaply and in unlimited quantities, starting with the naturally occurring fats and oils and without the use of expensive chemical reagents. The practice of my invention makes available a new and economical source of supply for these alcohols which will tend to develop important uses for the higher alcohols and their derivatives.

As many apparently widely different embodiments of this invention may be made without departing from the spirit and scope thereof, it is to be understood that I do not limit myself to the specific embodiments thereof except as defined in the appended claims.

I claim:

1. The process of hydrogenating a glyceride of an aliphatic carboxylic acid so as to produce materials of the group consisting of alcohols and waxy esters of said alcohols substantially free from hydrocarbons, which comprises bringing said glyceride and hydrogen into contact with a mild acting alcohol-forming hydrogenation catalyst at a temperature substantially above 200° C. and under a hydrogen pressure above 13.5 atmospheres.

2. A process for producing alcohols which comprises reacting hydrogen and a glyceride of an aliphatic carboxylic acid at a temperature of 250°–400° C., and at a superatmospheric pressure in the presence of a hydrogenation catalyst.

3. A process for producing alcohols which comprises reacting hydrogen and a glyceride of an aliphatic carboxylic acid at a temperature of 200°–400° C., and at a superatmospheric pressure in the presence of a hydrogenation catalyst.

4. The process of producing aliphatic monohydric alcohols which comprises treating with hydrogen and a hydrogenating catalyst a glyceride of an aliphatic carboxylic acid at a pressure above 13.5 atmospheres and at an elevated temperature capable of reducing the carboxyl group to a $CH_2OH$ group.

5. The process of producing aliphatic monohydric alcohols, which comprises catalytically hydrogenating the carboxyl group of a glyceride of an aliphatic carboxylic acid at a temperature substantially above 200° C. and at a pressure substantially in excess of 13.5 atmospheres.

6. The process of selectively hydrogenating a glyceride of an unsaturated aliphatic carboxylic acid having at least six carbon atoms to an unsaturated alcohol corresponding in chain length to the aliphatic carboxylic acid grouping in said glyceride, which comprises reacting said unsaturated glyceride with hydrogen at a temperature between 250° and 400° C. and at a pressure between 75 and 400 atmospheres in the presence of a hydrogenation catalyst comprising essentially zinc chromite.

WILBUR A. LAZIER.